United States Patent
Verschuur et al.

(10) Patent No.: US 6,168,080 B1
(45) Date of Patent: Jan. 2, 2001

(54) CAPACITIVE METHOD AND APPARATUS FOR ACCESSING CONTENTS OF ENVELOPES AND OTHER SIMILARLY CONCEALED INFORMATION

(75) Inventors: Gerrit L. Verschuur; Chauncey T. Mitchell, Jr., both of Lakeland; Corneliu C. Leordeanu, Memphis, all of TN (US)

(73) Assignee: Translucent Technologies, LLC, Algoma, WI (US)

( * ) Notice: Under 35 U.S.C. 154(b), the term of this patent shall be extended for 0 days.

(21) Appl. No.: 09/059,985

(22) Filed: Apr. 14, 1998

Related U.S. Application Data

(60) Provisional application No. 60/044,073, filed on Apr. 17, 1997.

(51) Int. Cl.[7] .................................................. G06K 7/10
(52) U.S. Cl. .................. 235/462.01; 235/487; 235/491; 235/493; 235/451; 235/492
(58) Field of Search ........................... 235/61.11, 61.12, 235/487, 491, 493, 462.01, 492, 451

(56) References Cited

U.S. PATENT DOCUMENTS

| | | | |
|---|---|---|---|
| 3,519,802 | 7/1970 | Cinque et al. | 235/61.11 |
| 3,593,319 | 7/1971 | Barber | 340/173 |
| 3,652,830 | * 3/1972 | Kessler | 235/61.12 |
| 3,699,311 | 10/1972 | Dunbar | 235/61.11 |
| 3,730,086 | 5/1973 | Dauterman | 101/148 |
| 3,903,543 | 9/1975 | Smith | 357/24 |
| 3,983,366 | * 9/1976 | Gunn | 235/61.11 |
| 4,201,339 | * 5/1980 | Gunn | 235/487 |
| 4,528,655 | 7/1985 | Tamura et al. | 369/126 |
| 4,591,189 | 5/1986 | Holmen et al. | 283/83 |
| 4,658,207 | 4/1987 | Scribano et al. | 324/61 |
| 4,706,014 | 11/1987 | Fabbri | 324/61 |
| 4,880,964 | 11/1989 | Donahue | 235/462.01 |
| 4,951,800 | 8/1990 | Yoshihara | 194/317 |
| 5,036,984 | 8/1991 | Labarthe | 209/312 |
| 5,068,617 | 11/1991 | Reich | 324/663 |
| 5,140,272 | 8/1992 | Nishimatsu et al. | 324/662 |
| 5,198,777 | 3/1993 | Masuda et al. | 324/671 |
| 5,231,359 | 7/1993 | Masuda et al. | 324/675 |
| 5,241,280 | 8/1993 | Aidun et al. | 324/671 |
| 5,281,921 | 1/1994 | Novak et al. | 324/671 |
| 5,288,994 | 2/1994 | Berson | 250/223 |
| 5,378,994 | 1/1995 | Novak et al. | 324/671 |
| 5,394,969 | 3/1995 | Harbaugh | 194/206 |
| 5,418,467 | 5/1995 | Floch et al. | 324/671 |
| 5,471,039 | 11/1995 | Irwin, Jr. et al. | 235/441 |
| 5,475,205 | 12/1995 | Behm et al. | 235/375 |
| 5,522,921 | 6/1996 | Custer | 106/21 |
| 5,528,153 | 6/1996 | Taylor et al. | 324/671 |
| 5,530,368 | 6/1996 | Hildebrand | 324/662 |
| 5,531,434 | 7/1996 | Kerschner | 271/263 |
| 5,599,046 | 2/1997 | Behm et al. | 283/83 |
| 5,621,200 | 4/1997 | Irwin, Jr. et al. | 235/375 |
| 5,650,730 | 7/1997 | Herbst, Jr. | 324/690 |
| 5,811,792 | * 9/1998 | Verschuur et al. | 250/223 |

FOREIGN PATENT DOCUMENTS

| | | | |
|---|---|---|---|
| 0040587 | * 2/1987 | (JP) | G06K/7/08 |
| WO9420932 | 9/1994 | (WO) . | |

* cited by examiner

*Primary Examiner*—Donald Hajer
*Assistant Examiner*—Daniel S Felten
(74) *Attorney, Agent, or Firm*—Eugene Stephens & Associates

(57) ABSTRACT

The contents of sealed envelopes are accessed by detecting and digitizing a change in capacitance produced when a pattern of dielectric or conductive ink is passed by a sensitive capacitance sensor. The capacitance changes are converted into corresponding electrical patterns for further processing.

53 Claims, 5 Drawing Sheets

CAPACITIVE METHOD AND APPARATUS FOR ACCESSING CONTENTS OF ENVELOPES AND OTHER SIMILARLY CONCEALED INFORMATION

This application claims the benefit of U.S. Provisional application No. 60/044,073, filed on Apr. 17, 1997, which provisional application is incorporated by reference herein.

TECHNICAL FIELD

The invention relates to the acquisition of encoded information from the contents of sealed envelopes or other layered structures that conceal the information from view.

BACKGROUND

Much of bulk return mail is processed with at least some manual handling, especially when it contains orders. Once cut open, the envelopes are generally emptied by hand; and information from their contents is keyboarded, optically scanned, or otherwise entered into a computer. The required steps of opening the envelopes, separating their contents, and entering relevant data are expensive and time consuming. Also, data entry is subject to error, especially when information from the separated envelopes must be linked to information from their contents.

Outgoing mail, which may be passed through inserters, is also subject to sorting and other processing errors that are difficult to detect; because once sealed, the contents are concealed from view. Various attempts have been made to "see through" the envelopes to read their contents without opening them, but problems plague each.

U.S. Pat. No. 5,522,921 to Custer proposes use of x-rays for reading envelope contents that are printed with special x-ray opaque materials. The x-rays are intended to penetrate the envelopes and their contents except where blocked by the special materials. A resulting shadow pattern is detected by an x-ray reading device. However, the special materials add expense and limit printing options, and the x-rays pose health risks that are difficult to justify for these purposes.

U.S. Pat. No. 5,288,994 to Berson uses infrared light in a similar manner to read the contents of sealed envelopes. A light source directs a beam of the infrared light through the envelopes to an optical detector that records a shadow pattern caused by different absorption characteristics between conventional inks and the paper on which they are printed. However, such filled envelopes make poor optical elements for transmitting images, even for transmissions in the infrared spectrum. Paper does not transmit the infrared images very efficiently. Irregularities in the surfaces, spacing, layering, and materials of the envelopes and their contents cause significant aberrations that can greatly diminish resolution of the images. Also, overlays of printed material on the envelopes and their contents are difficult to separate, and printed backgrounds can reduce contrast.

Except for differences in wavelength, these prior art attempts are analogous to shining a flashlight through one side of an envelope in the hope of reading darker printed matter through the envelope's opposite side. X-rays penetrate paper very easily but are dangerous and require special materials to stop them. Near infrared wavelengths transmit poorly through paper, and their images are subject to aberration from optical inconsistencies and to obscuration from printed overlays or backgrounds.

U.S. patent application 08/778,077, filed Jan. 2, 1997, by two of the present co-inventors Verschuur and Mitchell, uses microwave heating of conductive or dielectric patterns and subsequent infrared detection of the thermal image conducted to the surface of the envelope to determine the information content inside a sealed envelope.

The two present co-inventors along with a third co-inventor have developed another approach to reading through envelopes—the subject of this application, which is independent of any wavelength of radiation, either for seeing through or detecting emission from the surface of an envelope. Instead, a transducer measures changes in capacitance of a localized region beneath the surface of the envelope, such as can be produced by conductive inks or inks with a dielectric constant different from the paper upon which it is printed. This technique shares common elements with other inventions, particularly those for authenticating lottery tickets, documents, and currency, yet is substantially different in both function and purpose.

U.S. Pat. No. 5,621,200 to Irwin, Jr. et al. discloses an electronic validation system for scratch-off lottery tickets. A conductive ink containing a pattern of resistors is printed as a portion of the scratch-off material or underlying play indicia. Capacitors are used to couple the printed resistor circuits to an electronic verification machine to verify electronic signature patterns of the resistor circuits. The electronic signatures are comparable to predetermined standards, but they do not contain information encoded in conventional formats that can be read as alphanumeric characters. Also, each ticket must be tested one at a time at a predetermined position within the verification machine.

U.S. Pat. No. 3,519,802 to Cinque et al. discloses an early attempt at authenticating credit cards with internally encoded data. Conductive plates are arranged in a pattern; and their presence, absence, or proximate orientation is detected by a capacitance sensor. However, the detection system requires the conductive plates to be bent into two offset planes that complicate manufacture and are not readily applicable to thinner substrates such as sheet materials normally enclosed by envelopes.

U.S. Pat. No. 4,591,189 to Holmen et al. discloses a more recent example of a credit card verification system in which a light transmitting authenticating layer is sandwiched between two anti-reflective film layers. The authenticating layer is preferably vacuum deposited, such as by sputtering, but can also be formed by a printed layer of conductive ink. The impedance, conductance, or capacitance of the authenticating layer can be detected, though capacitance is not recommended for detecting discrete areas of the authenticating layer. Beyond authentication, the conductive layer does not contain any useful information.

SUMMARY OF THE INVENTION

Our invention takes a different approach to accessing information from the contents of sealed envelopes or other layered structures by making use of localized capacitance changes introduced onto a substrate, such as a paper insert inside an envelope, by conductive or dielectric ink used to print encoded information such as a bar-code. The information obtained by the capacitance measurements can be meaningfully interpreted and used to affect further processing of the envelopes or other layered structures.

The encoded information concealed behind a cover, such as an envelope, can be printed on a substrate in a pattern using an electrically conductive ink. The substrate and cover are moved past a capacitance sensor at a rate that permits successive portions of the pattern to be measured at points of approximately equal proximity to the capacitance sensor.

Variations in capacitance associated with the pattern of the conductive ink are detected as a function of the relative position of the capacitance sensor along the covered substrate and are compared to stored information about similar patterns for reading the encoded information.

The invention is particularly useful for processing a succession of envelopes having processing information encoded in their contents. The processing information is recorded in patterns of contrasting permittivity. The envelopes are transported together with their encoded contents past a capacitance sensor. Measured variations in the capacitance associated with the patterns of contrasting permittivity are deciphered into recognized units of information. Subsequent processing among envelopes is distinguished on the basis of the processing information obtained from their contents.

For example, the processing information can be arranged to identify intended addressees of the envelopes. The actual addressees can be read by standard optical means from the exterior of the envelopes and compared to the address information obtained from their contents to verify if they match. The further processing of the envelopes is discontinued upon detection of a mismatch. Alternatively, the address information obtained from the envelopes' contents can be used to print corresponding address information on the exterior of the envelopes. Orders for further processing can also be read from the envelopes' contents.

A system for carrying out the invention can include a transporter that conveys a succession of covered substrates imprinted with conductive ink in patterns representing encoded information visibly obscured by a cover. A capacitance measuring device through which the succession of covered substrates are transported is sensitive to variations in capacitance associated with the patterns of the conductive ink as a function of the transported positions of the covered substrates through the capacitance measuring device. A processor matches the measured variations in capacitance to stored information about similar patterns for reading the encoded information, and a sorter distinguishes subsequent processing of the covered substrates based on the encoded information imprinted on the substrates and obscured by the cover.

The capacitance variations are preferably sensed by a transducer comprising (a) parallel plates of a capacitor placed side-by-side on one side of the covered substrates, (b) one pair of such side-by-side plates on each side of the covered substrates, (c) a pair of such plates on one side of the covered substrates and a ground plane on the other side of the covered substrates, or (d) a pair of plates aligned end-to-end on one side of the covered substrates. An output signal is detected by means of a circuit that converts what amounts to an impedance change into a voltage change which can then be used to drive an A/D converter with its output fed to a computer where the signal can be processed to retrieve information and control other processes.

Well-known pattern recognition programs can be used to interpret the detected signals for controlling subsequent operations. For example, orders and customer-identifying codes from return mail can be read for processing orders. Inside addresses or other contents of outgoing mail can be verified or used as a basis for printing information including address information on the outside of the envelopes.

DRAWINGS

Figure 5:
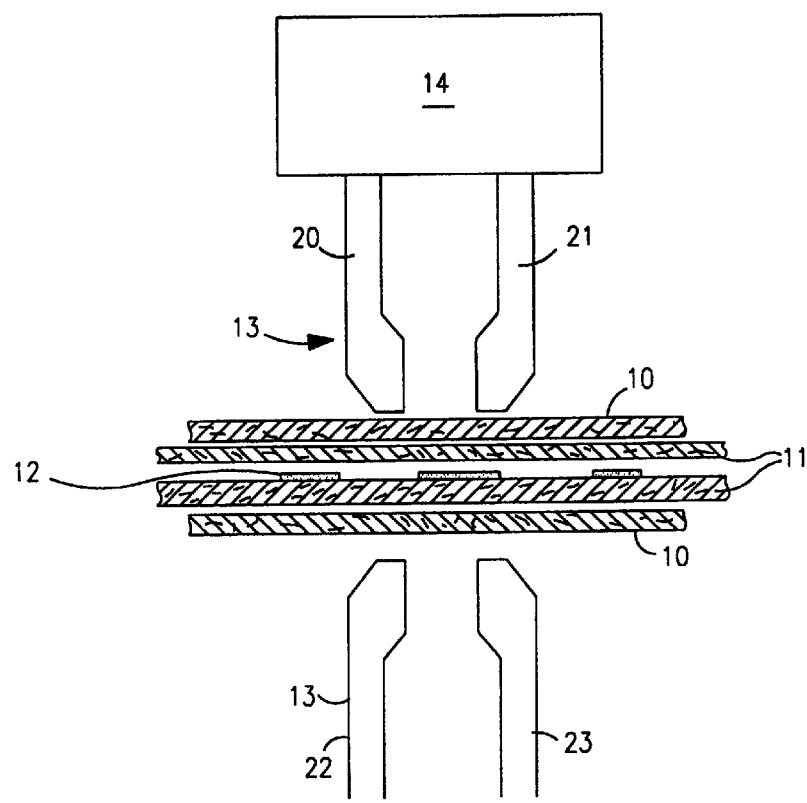

FIG. 5 an alternative transducer design that facilitates mapping encoded information other than bar-codes.

Figure 6:
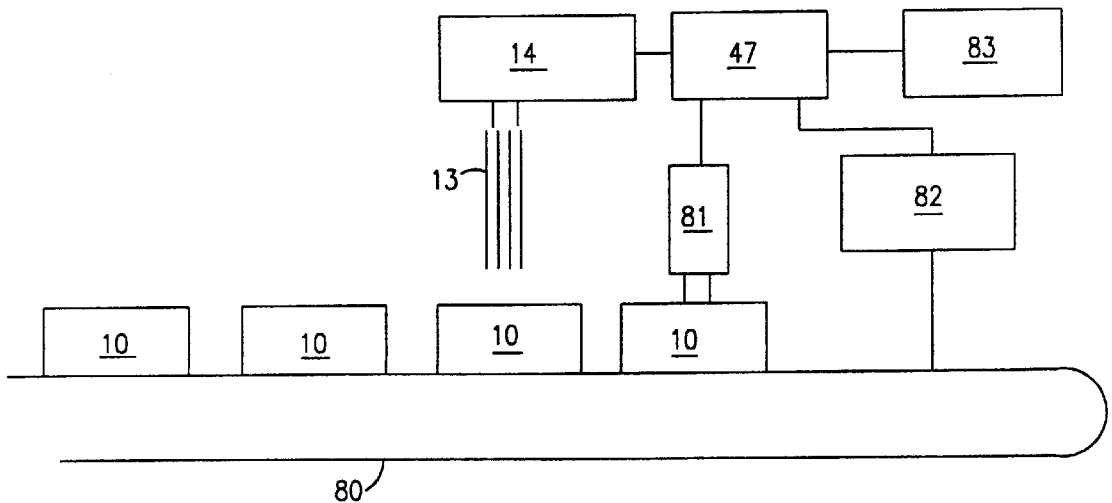

FIG. 6 shows how the computer interprets the signals to control further data processing and/or mechanical actions.

Figure 7:
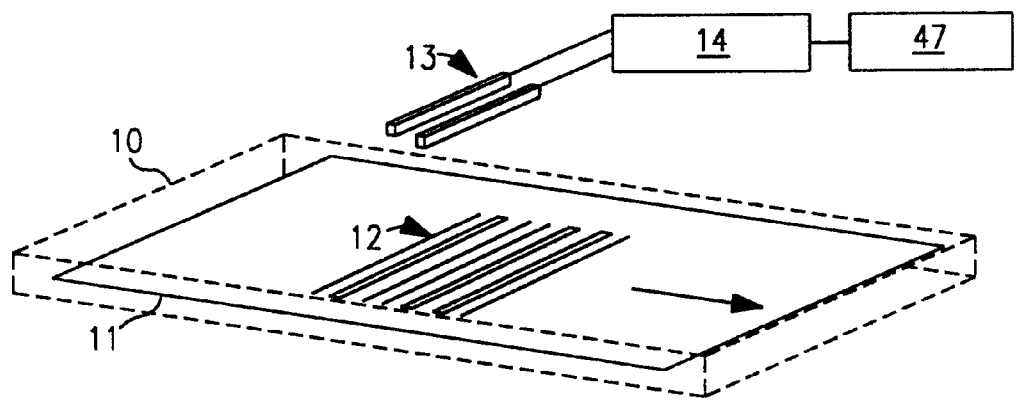

FIG. 7 is a schematic diagram showing an alternative layout of a transducer for measuring capacitance.

Figure 8:
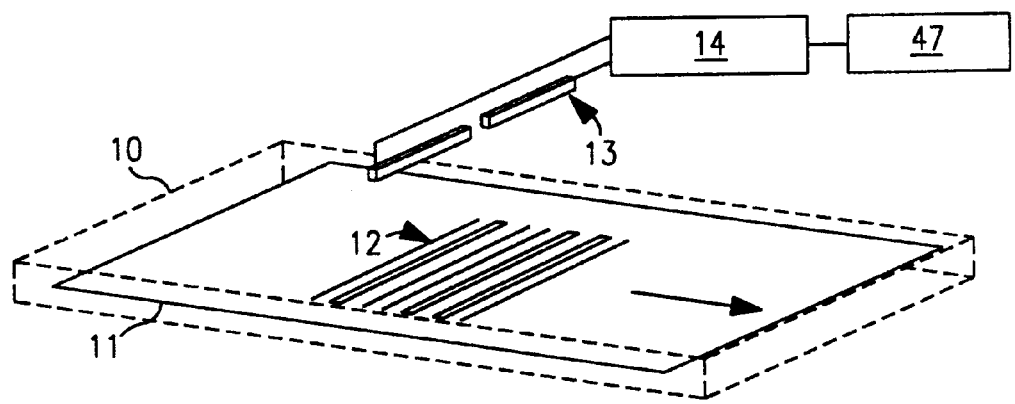

FIG. 8 is a schematic diagram showing another alternative layout of a transducer for measuring capacitance.

DETAILED DESCRIPTION

Figure 1:
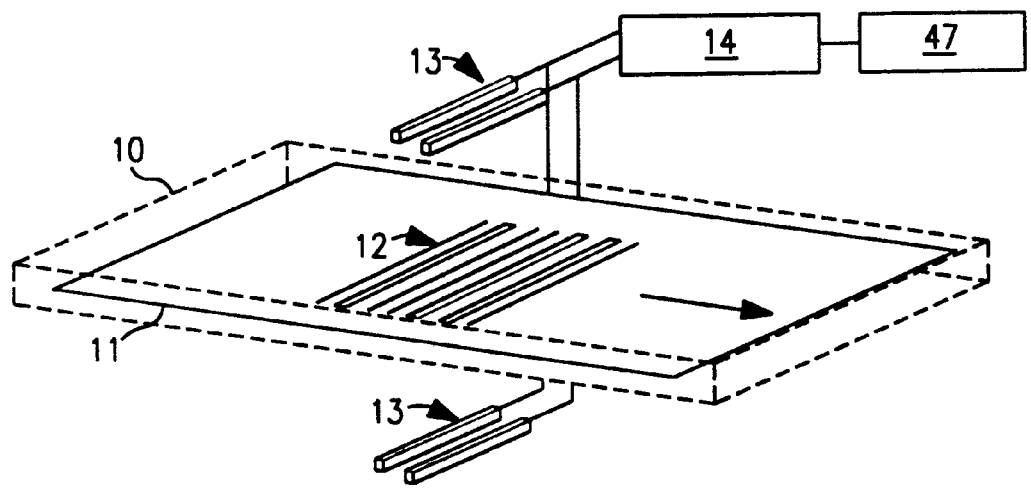
FIG. 1 illustrates a basic layout of the capacitive hidden character recognition system.

In FIG. 1, an envelope 10 containing an insert (substrate) 11 on which encoded information is printed, in this example in the form of a bar-code 12, passes between a set of parallel plate capacitors (also referred to as a transducer) 13 which are connected to an amplifier 14 whose output is then examined by a computer 47. The bar-code 12 is printed using either a conductive ink or a dielectric ink. When either passes between the plates 13 of the transducer, the capacitance changes.

Figure 2:
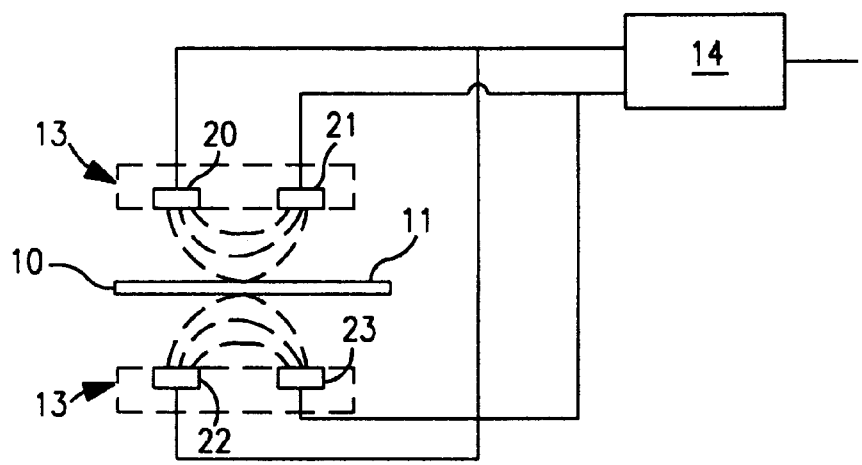
FIG. 2 is a schematic of the electrode placements making up the transducer that can be utilized in a capacitive measuring device.

In a practical embodiment of the invention, the envelope is passed between two parallel sets of plates as shown in FIG. 2. When no envelope is present between plates 20–21 and 22–23 of the transducer 13, the capacitance is $C_0$ and this is made part of a resonant circuit built into the amplifier 14, whose frequency is established by a suitable choice of inductance L. When an envelope 10 passes the probe (transducer 13), the capacitance changes to $C_1$. A further change to $C_2$ is sensed when the conductive or dielectric ink, with a permittivity other than that of the insert 11 within the envelope 10, passes between the plates 20–21 and 22–23.

The inserts 11 on which encoded information is printed are preferably paper, which is a dielectric. However, other nonconducting materials including resin films or fabric materials can also be used as substrates for supporting conductive substances or substances with different permittivities. The conductive ink used for printing the bar-code 12 can be visible for conveying additional optically readable information on the inserts 11 or can be invisible for performing other functions such as those relating to tracking, accounting, or security. The bar-code 12 can also be hidden between layers of the inserts 11 for similar purposes. An example of a conductive ink appropriate for these purposes is used in a Hewlett-Packard desk jet printer, model number 870CSE.

Figure 3:
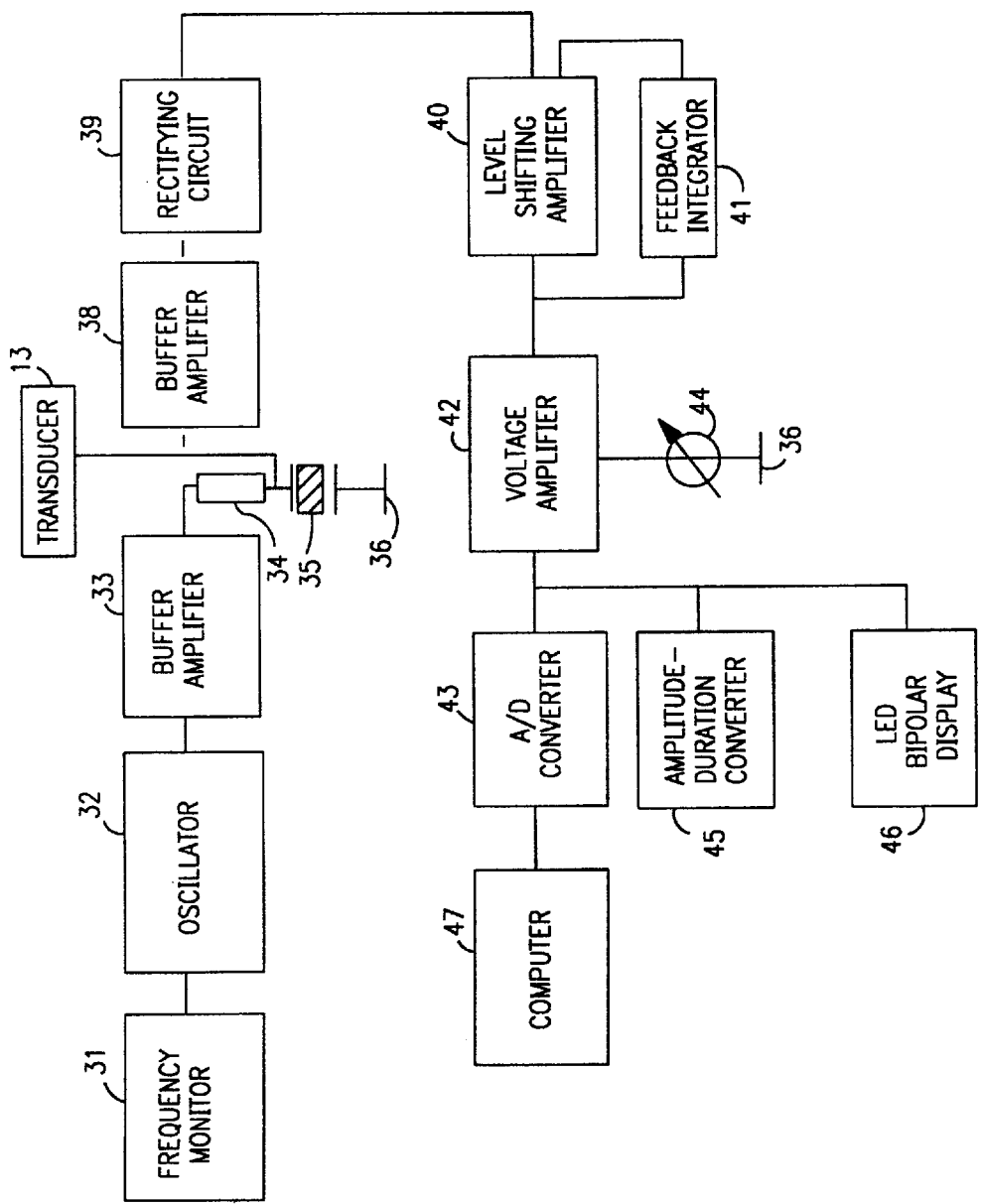
FIG. 3 is a block diagram representation of exemplary components of an electronic circuit for processing capacitance variations.

In the block diagram of FIG. 3, an oscillator circuit 32 is used to generate a fixed frequency based on a Colpitts-crystal modified circuit. A frequency monitor 31 allows the operation of the instrument to be monitored for test purposes while also improving the frequency stability.

The output of the oscillator 32 is fed through a buffer amplifier 33, which is also part of the oscillator circuit 32. The buffer amplifier 33 is a voltage source which together with an impedance 34 acts as a constant AC current generator to supply a high-Q resonator crystal 35 in turn connected to a floating ground 36. The crystal 35 is specified to operate at a frequency $f_2$ only slightly different from $f_1$ at which the oscillator 32 functions.

The transducer 13 in parallel with the crystal 35 modifies the impedance seen by the current generator (consisting of the buffer amplifier 33 in combination with the impedance 34), thus generating a variable voltage which reflects the capacitance sensed by the transducer 13.

This modulated, high-frequency signal at $f_1$ is amplified by a buffer amplifier 38, which is also used to separate the high-Q resonator crystal 35 from the low impedance side of a detection-rectifying circuit 39. This circuit 39 will demodulate the signals introduced by the buffer amplifier 38 as a result of impedance changes at the transducer 13 produced by the passage of the information printed on inserts inside sealed envelopes. The rectifying circuit 39 uses a thermal compensation technique for stability.

The output of the rectifying circuit 39, which is current amplified, is fed to a level shifting amplifier 40, which together with a feedback integrator 41 produces a signal that is forced to a level close to that of the floating ground 36 and cancels the undesirable "common mode" that would otherwise affect the final amplification in a voltage amplifier 42.

The feedback integrator 41 acts as a high-pass filter that allows rapidly varying signals, introduced at the transducer 13 by the passage of the encoded information inside the envelope 10, to be amplified by amplifiers 40 and 42 to the level required by an A/D converter 43. More slowly varying signals, such as are produced by temperature changes or localized permittivity variations along the length of the rapidly passing envelopes 10 due to structure in the envelope or insert material, are canceled by the action of the feedback integrator 41.

Further undesirable signals that may pass through what is essentially a high-pass filter (integrator 41) can be discriminated against by initially adjusting a threshold level of the amplifier 42 using a voltage source 44.

A second input to the A/D converter 43 is produced by an amplitude-duration converter 45, which offers a pulse train representation of the signals introduced at the transducer 13. These signals will have an amplitude that is a function of the width of the lines of the bar-code 12, for example. The lines of the bar-code 12 have a variety of widths; and the change in impedance sensed by the transducer 13 depends on this width, which is equivalent to changing the plate area of the effective capacitor created by the conductive or dielectric lines of the bar-code 12 as they pass by the transducer 13.

A LED bipolar display 46 is used in conjunction with the threshold level adjustment control of voltage source 44 to set initial conditions for the amplifier 42. The display 46 indicates a range of voltages from negative to positive values with respect to a zero-centered reference representing the floating ground 36.

The output of the A/D converter 43 is sent to a computer 47, which allows the signals produced at the transducer 13 to be decoded. This information from the computer 47 can also be used to control the speed at which envelopes are sent past the transducer 13, and the same information can be used to drive a feedback loop to drive the voltage source 44 to remove undesirable signals such as can be produced by accumulated static charges.

Figure 4:
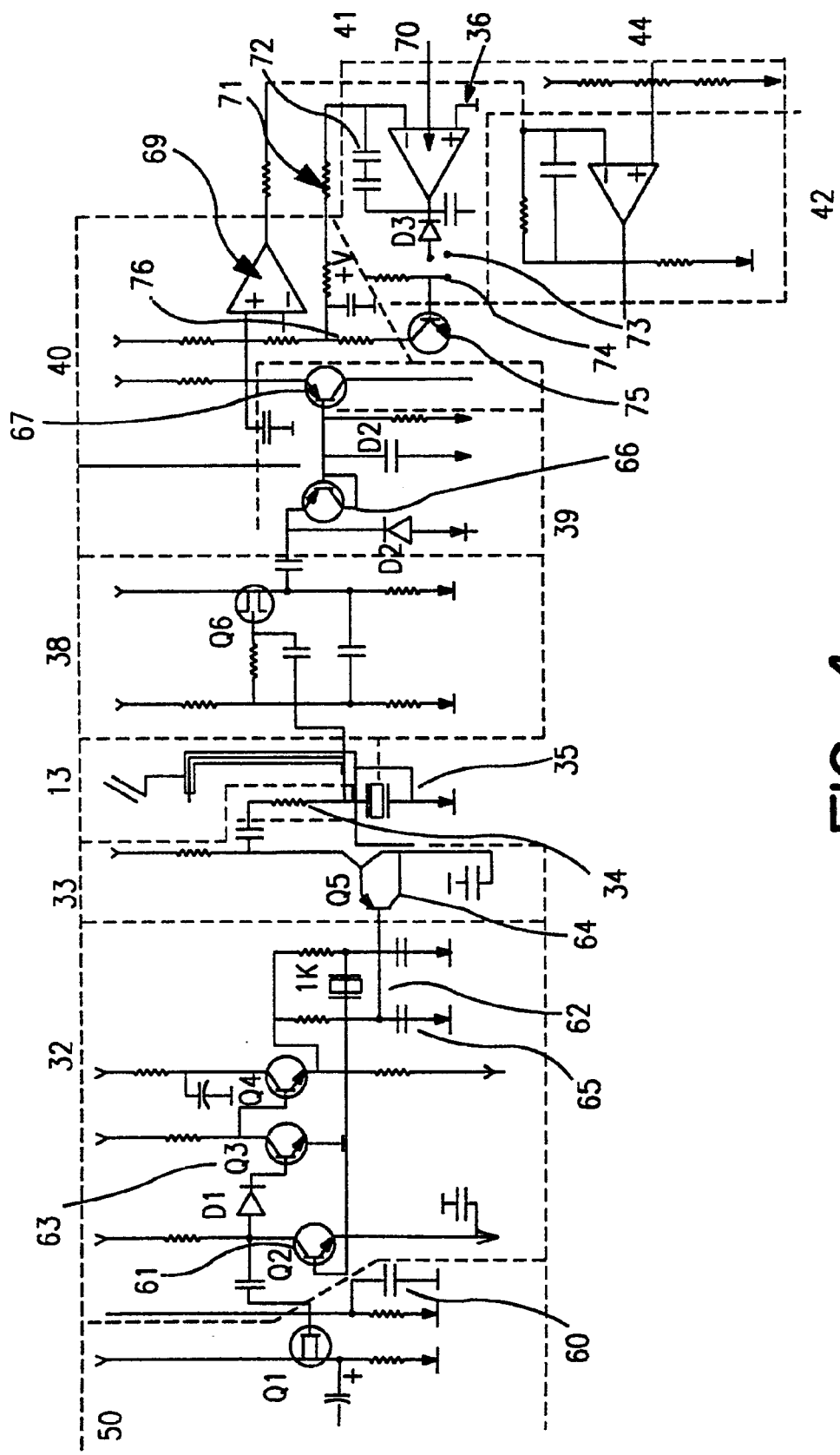
FIG. 4 shows a wiring diagram of key electronics used for processing the capacitance variations.

In FIG. 4, a circuit 50 acts as a buffer to the frequency monitor 31, which also forms part of the oscillator circuit 32 with a capacitance 60 introduced into the emitter of a main oscillator transistor 61. High stability ($10^{-7}$) in frequency is obtained in the oscillator circuit 32 by using a crystal 62 ($f_{31}$=4.93152 MHz) in combination with a phase shifter 63. The combined effect of capacitance 60 and those of the base-collector of the transistor 61 and an element 64 will increase the capacitance of an element 65 by an amount sufficient to sustain an oscillation. In this way, buffer amplifier 33 acts as a buffer and amplifier for an unusual output tapped across element 65 of the oscillator circuit 32.

The high-speed buffer amplifier 33 will act as an emitter-follower generating a powerful signal to the series configuration of the impedance 34 and the crystal 35, which has an intrinsic resonant frequency $f_2$=5.0000 MHz.

No adjusting device is needed inside the oscillator circuit 32 because of the use of two buffers (50 and 64) with their own capacitive effect. This adds not only simplicity but also considerable size reduction over previous techniques, which generally incorporate numerous trimmers and screens.

The combination of the impedance 34 and the crystal 35 will act as a voltage divider. The impedance 34 is constant while that presented by the crystal 35 varies in response to the modifying capacitance sensed by the transducer 13 as the desired signal.

In the absence of a trace at the transducer carrying encoded information, only the paper permittivity will affect the transducer capacitance. This creates the highest impedance seen across the crystal 35, that is, the highest level of voltage produced across the crystal 35 based on the divider effect. Any additional capacitance (for example, when a conductive or a dielectric trace is present between the electrodes; see FIG. 2) will decrease the impedance presented by the resonant circuit formed by crystal 35 in parallel with the transducer 13. It is well known in the art that increasing capacitance will decrease the resonant frequency of a parallel resonant configuration. Note that the buffer amplifier 33 is injecting a constant amplitude and frequency signal ($f_{31}$) into the divider, which is therefore forced to resonate at this frequency ($f_{31}$). The highest impedance presented by the crystal 35 occurs at $f_2$, a frequency that is never found in our circuit because of the existence of the parallel capacitance introduced by the transducer 13. This means that the crystal 35 will never exhibit its maximum impedance value. To the contrary, any additional capacitance in the transducer side will decrease the resonant frequency even further and thus reduce the equivalent impedance presented by the crystal 35 as part of the divider circuit consisting of the impedance 34 and the crystal 35. The decreased resulting signal will be amplified by the bootstrapped buffer amplifier 38 and supplied to the rectifying circuit 39.

Note that the signal collected from the transducer 13 (the same as the signal collected across crystal 35) will sharply decrease for very small capacitive changes of $10^{-2}$ to $10^{-3}$ pF (values corresponding to those expected for coded information printed with conductive inks as independently determined using a professional LCR reference meter) because of the high Q of the resonator crystal 35 and the high impedances and low capacitances on either side of the crystal 35.

Following the rectifying circuit 39, the signal is processed by the level-shifting amplifier 40 and the feedback integrator 41. The signal at the emitter of a transistor 67 is above the floating ground in a positive voltage domain, creating an undesirable "common mode" for an amplifier 69. A feedback loop is therefore included which consists of an integrator 70 and a transistor 75, which will adjust the inverting input voltage of the amplifier 69 to be the same as the level of the non-inverting input of the same amplifier.

The output signal of the amplifier 69 will be forced in this way to the level of the floating ground 36 taking into account that the integrator 70 is self-creating a zero voltage between its inputs. The integrator 70 time-constant, which is determined by the product of elements 71 and 72, is much larger than the expected pulse duration of the signal produced at the transducer 13 but shorter than the time scale of expected temperature variations that can affect the signal. Previous art (U.S. Pat. No. 5,231,359) has used a similar technique to modify the reactance of the resonator crystal 35 by altering a variable capacitance diode in parallel with the resonator. This requires many additional electronic circuit elements and does not negate the temperature effects suffered by the integrator 70 itself on the resonator side upon which it acts. In our circuit, all summed temperature effects are canceled at the level shifter, thus not affecting the performance of the resonator. Another advantage is using the amplifier 69 as a real amplifier (with gain 30 here) as a first amplification stage.

A switch 74 together with a potentiometer 76 allows for initial calibration when the integrator loop is disconnected.

The measured parameters for the crystals 62 and 35 indicate a quality factor of over 500 could be achieved at 5 MHz with parallel equivalent capacitance of 3.335 and 3.257 pF respectively. It is with respect to these capacitances that the very small additional capacitance produced at the transducer (1 fF) has to be detected. High selectivity resonant curves of the crystals offer the possibility to operate in the MHz frequency range instead of the GHz range adopted by others in previous work together with all the unwanted problems introduced by operation at such high frequencies (e.g., screening, interference, reflection, etc.).

Because of high sensitivity of the crystal circuits, only two stages of amplification are used (amplifiers 40 and 42). Amplifier 42 is an inverting amplifier, and its feedback network is adjusted to filter the signals sensed at the transducer. The adjustment control (voltage source) 44 will set the threshold level for the signals that have to be processed by the A/D converter 43.

The amplitude-duration converter 45 will translate with a sample-and-hold circuit combined with a linear sweep integrator the peak amplitude of every signal pulse into a pulse train consisting of equal amplitude pulses, but with a width of individual pulses corresponding to their initial amplitudes. Since the initial amplitudes are indicative of the widths of the lines in the bar-code 12, the converter 45 allows a visual display of the original bar-code to be exhibited on a video monitor (not shown) driven by the computer 47.

FIG. 5 represents a refinement of the transducer 13 that will allow more complex structure than simple bar-codes to be mapped and hence interpreted. The transducer plates 20–21 and 22–23 are terminated in flattened points above and below the envelope 10. A permanent capacitance between plates 20–21 as well as 22–23 will be modified by the presence of conductive or dielectric ink of the bar-code 12 on the insert(s) 11 enclosed in the envelope 10. By arranging an array of such transducers 13 to cover the width of an envelope passing the array, an image of the contents of the envelope can be built up within the computer 47, making use of the translation of the envelope past the transducers as the time base.

FIG. 6 shows a train of envelopes 10 being driven past the transducer 13 by means of a conventional envelope transport mechanism such a belt drive 80. The signals amplified by amplifier 14 are fed into the computer 47 and interpreted to suit the needs of a particular use. For example, conventional recognition programs can be run to interpret the information pattern of the bar-code 12. The computer 47 can also be used to monitor the speed with which the envelopes 10 are measured to arrive at the transducer 13, and this information can be used to alter the speed of a drive 82 for the transport belt 80.

A variety of further processing can take place based on the information acquired from contents 83 of the envelopes 10. For example, the envelopes 10 can be sorted according to their contents 83, orders or replies can be generated, records can be updated, or the information can be verified. In the in-line system of FIG. 6, a conventional printer 81 is controlled to print information on the envelopes' outer surfaces (exteriors), which is linked to the information acquired from the contents 83 of the envelopes 10. For example, addresses can be printed to match address or other identifying information acquired from the contents 83 of the envelopes 10.

Instead of printing the address information on the envelopes' outer surfaces, previously printed address information could be read from the envelopes' outer surfaces by a conventional optical reader and compared with the identifying information acquired from their contents. Further processing of the envelopes can be interrupted upon detection of a mismatch between the two addresses, and the mismatch can be corrected.

While the information encoded in the envelopes' contents 83 is preferably a conventional bar-code, other conventional symbols interpretable in alphanumeric characters could also be used to support the further processing of the envelopes 10. Unique self-defined symbols could also be used.

The remaining two drawing figures illustrate other arrangements of the transducer 13. In FIG. 7, the plates of transducer 13 are arranged parallel to each other and oriented normal to a transport direction of the envelope 10. In FIG. 8, the plates of the transducer 13 are aligned end-to-end and oriented normal to the transport direction of the envelope 10. The latter arrangement is preferred for measuring linear bar-code patterns, although spatial resolution may be less.

Further to either arrangement, the transducers 13 are preferably mounted either above or below the envelopes within a shielded housing (not shown) with one or more grounds. A ground plate (not shown) can also be mounted on the opposite side of the envelope 10, a variation on a principle used in non-contact capacitive displacement measurement devices such as a Micro-Epsilon System E+H unit. A Faraday shield or cup (also not shown) can also be mounted opposite to the transducer to guard against entry of stray radiation.

The plates of transducer 13 can be made using printed circuit board technology by etching away a conductive surface except in a region where the plates are created. The circuit board (not shown) can be cut or drilled between adjacent plates to create a localized air gap.

In addition to the processing of envelopes with hidden contents, the invention can also be used to read information hidden in other ways such as within packaging or behind labels. For example, conductive ink could be used to print instructional or identifying information between layers of labels or other laminates to control further operations on or with the labels.

We claim:

1. A method of reading information encoded on a substrate behind a cover in a pattern using an electrically conducting ink comprising the steps of:

relatively moving the encoded substrate and cover past a capacitance sensor in a fashion that permits different portions of the pattern to be measured at points of approximately equal proximity to the capacitance sensor;

successively measuring the different portions of the pattern as the encoded substrate is relatively moved past the capacitance sensor:

detecting variations in capacitance associated with the pattern of the conductive ink as a function of a relative position of the capacitance sensor along the covered substrate; and matching the detected variations in capacitance to stored information about similar patterns for reading the encoded information.

2. The method of claim 1 in which the encoded information is printed in the form of a bar-code.

3. The method of claim 1 in which the electrically conductive ink is invisible.

4. The method of claim 1 in which the capacitance sensor includes side-by-side plates and including the further step of orienting the side-by-side plates adjacent to a common side of the substrate.

5. The method of claim 1 in which the substrate is substantially composed of a dielectric material.

6. The method of claim 1 in which the substrate has a plane surface, and the encoded information is printed entirely on the plane surface.

7. A method of reading information encoded on a substrate behind a cover in a pattern using an electrically conducting ink comprising the steps of:

relatively moving the encoded substrate and cover past a capacitance sensor in a fashion that permits different portions of the pattern to be measured at points of approximately equal proximity to the capacitance sensor;

successively measuring the different portions of the pattern as the encoded substrate is relatively moved past the capacitance sensor;

detecting variations in capacitance associated with the pattern of the conductive ink as a function of a relative position of the capacitance sensor along the covered substrate; and matching the detected variations in capacitance to stored information about similar patterns for reading the encoded information;

wherein the encoded information is printed on the substrate in patterns that represent alphanumeric characters.

8. The method of claim 1 in which said step of detecting variations in capacitance includes detecting consequences of a change of impedance in a resonant circuit produced by the variations in capacitance.

9. A method of processing a succession of envelopes having processing information encoded in their contents comprising the steps of:

transporting the succession of envelopes together with their encoded contents past a capacitance sensor;

measuring variations in capacitance associated with patterns of the processing information recorded as a contrast in permittivity between the patterns and an underlying substrate;

deciphering the patterns into recognized units of information; and distinguishing subsequent processing among envelopes on the basis of the processing information obtained from their contents; wherein the patterns of the processing information are recorded in electrically conductive ink.

10. A method of processing a succession of envelopes having processing information encoded in their contents comprising the steps of:

transporting the succession of envelopes together with their encoded contents past a capacitance sensor;

measuring variations in capacitance associated with patterns of the processing information recorded as a contrast in permittivity between the patterns and an underlying substrate;

deciphering the patterns into recognized units of information; and distinguishing subsequent processing among envelopes on the basis of the processing information obtained from their contents;

wherein said step of distinguishing includes sorting the envelopes in accordance with the processing information obtained from their contents.

11. A method of processing a succession of envelopes having processing information encoded in their contents comprising the steps of:

transporting the succession of envelopes together with their encoded contents past a capacitance sensor:

measuring variations in capacitance associated with patterns of the processing information recorded as a contrast in permittivity between the patterns and an underlying substrate;

deciphering the patterns into recognized units of information; and distinguishing subsequent processing among envelopes on the basis of the processing information obtained from their contents;

wherein said processing information identifies intended addressees of the envelopes.

12. The method of claim 11 comprising the further steps of reading address information printed on an exterior of the envelopes and comparing the address information from the envelopes with the intended addressees obtained from their contents to determine if they match.

13. The method of claim 12 in which said step of distinguishing includes interrupting further processing of the envelopes upon detection of a mismatch between the address information from the envelopes and the intended addressees obtained from their contents.

14. The method of claim 11 in which said step of distinguishing includes printing address information on exteriors of the envelopes corresponding to the intended addressees obtained from their contents.

15. A method of processing a succession of envelopes having processing information encoded in their contents comprising the steps of:

transporting the succession of envelopes together with their encoded contents past a capacitance sensor:

measuring variations in capacitance associated with patterns of the processing information recorded as a contrast in permittivity between the patterns and an underlying substrate;

deciphering the patterns into recognized units of information: and distinguishing subsequent processing among envelopes on the basis of the processing information obtained from their contents;

wherein said step of distinguishing includes generating a reply in accordance with the processing information obtained from the envelopes' contents.

16. The method of claim 9 including the further step of printing the processing information on the substrate in a pattern using the electrically conductive ink.

17. The method of claim 9 in which the patterns of processing information recorded are recorded in a bar-code.

18. A method of processing a succession of envelopes having processing information encoded in their contents comprising the steps of:
   transporting the succession of envelopes together with their encoded contents past a capacitance sensor;
   measuring variations in capacitance associated with patterns of the processing information recorded as a contrast in permittivity between the patterns and an underlying substrate;
   deciphering the patterns into recognized units of information; and
   distinguishing subsequent processing among envelopes on the basis of the processing information obtained from their contents;
   wherein said step of deciphering includes converting the patterns of processing information into equivalent alphanumeric characters.

19. A system for assessing and processing encoded information printed on a succession of substrates with a conductive ink in patterns representing the encoded information comprising:
   a transporter that conveys the succession of substrates printed with conductive ink in patterns representing encoded information;
   a capacitance measuring device through which said succession of substrates is transported being sensitive to variations in capacitance associated with the patterns of the conductive ink as a function of a transported position of the substrates through the capacitance measuring device; and
   a processor that evaluates the measured variations in capacitance for reading the encoded information.

20. A system for assessing and processing hidden information imprinted on a succession of covered substrates comprising:
   a transporter that conveys a succession of covered substrates imprinted with conductive ink in patterns representing encoded information visibly obscured by a cover;
   a capacitance measuring device through which said succession of covered substrates are transported being sensitive to variations in capacitance associated with the patterns of the conductive ink as a function of a transported position of the covered substrates through the capacitance measuring device;
   a processor that matches the measured variations in capacitance to stored information about similar patterns for reading the encoded information; and
   a sorter that distinguishes subsequent processing of the covered substrates based on the encoded information imprinted on the substrates and obscured by the cover;
   wherein said substrates include inserts printed with the conductive ink and mounted inside envelopes.

21. The system of claim 20 further comprising an optical reader for reading information printed on an outside of said envelopes.

22. The system of claim 21 in which said processor compares information read from the outside of the envelopes with the encoded information read from the inserts and controls a subsequent operation based on results of the comparison.

23. The system of claim 20 further comprising a printer for printing address information on exteriors of the envelopes.

24. The system of claim 23 in which the encoded information read by said processor includes intended addressees of the envelopes, and said processor further provides for controlling said printer for printing corresponding address information on the envelopes.

25. The system of claim 19 in which the capacitance measuring device includes a pair of plates located adjacent to one side of the substrates.

26. The system of claim 25 in which said plates are arranged in parallel and oriented normal to a direction at which the substrates are transported past said plates.

27. The system of claim 25 in which said plates are aligned end-to-end and oriented normal to a direction at which the substrates are transported past said plates.

28. The system of claim 25 in which said encoded information is printed in the form of a bar-code, and said plates are aligned with the bar-code.

29. The system of-claim 28 in which capacitance is detected through an impedance change produced in a sensing circuit of the capacitance measuring device.

30. The system of claim 19 in which the conductive ink is printed on the substrates in a bar-code pattern.

31. The system of claim 30 in which said processor matches the measured variations in capacitance with known bar-code patterns to read the encoded information.

32. The system of claim 19 further comprising a sorter that distinguishes subsequent processing of the substrates based on the encoded information printed on the substrates.

33. The system of claim 19 in which the conductive ink is invisible.

34. The system of claim 19 further comprising covers that overlay the patterns of conductive ink on the substrates.

35. The system of claim 34 in which the covers obscure the patterns of conductive ink.

36. A method of accessing information encoded on a substrate in a pattern using an electrically conductive ink comprising the steps of:
   relatively moving the encoded substrate past a capacitance sensor in a fashion that permits different portions of the pattern to be measured in different relative positions between the encoded substrate and the capacitance sensor;
   successively measuring the different portions of the pattern as the encoded substrate is relatively moved past the capacitance sensor;
   detecting variations in capacitance within the pattern of the conductive ink; and
   evaluating the detected variations in capacitance for accessing the information encoded within the different portions of the pattern.

37. The method of claim 36 in which said step of relatively moving includes relatively moving the encoded substrate past a capacitance sensor including side-by-side plates.

38. The method of claim 37 including the further step of orienting the side-by-side plates adjacent to a common side of the encoded substrate.

39. The method of claim 36 in which the step of relatively moving includes relatively moving the encoded substrate together with a cover that overlays the pattern of conductive ink on the substrate.

40. A method of accessing information encoded on a substrate in a pattern using an electrically conductive ink comprising the steps of:

relatively moving the encoded substrate past a capacitance sensor in a fashion that permits different portions of the pattern to be measured in different relative positions between the encoded substrate and the capacitance sensor;

successively measuring the different portions of the pattern as the encoded substrate is relatively moved past the capacitance sensor;

detecting variations in capacitance within the pattern of the conductive ink; and evaluating the detected variations in capacitance for accessing the information encoded within the different portions of the pattern;

wherein said step of relatively moving includes relatively moving a succession of encoded substrates past the capacitance sensor, at least some of which are printed with a pattern using an electrically conductive ink.

41. The method of claim 40 including the further step of sorting the encoded substrates based on the information accessed from the patterns of electrically conductive ink.

42. The method of claim 36 in which said step of detecting includes monitoring an impedance change in a sensing circuit of the capacitance sensor.

43. The method of claim 36 in which said step of evaluating includes converting the encoded patterns into equivalent alphanumeric characters.

44. The method of claim 36 in which said step of evaluating includes matching the detected variations in capacitance to stored information about similar patterns for reading the encoded information.

45. The method of claim 36 including the further step of printing the electrically conductive ink on the substrate in a pattern that encodes information distinguished by a shape of the pattern.

46. The method of claim 45 in which the pattern is a bar-code pattern.

47. The method of claim 45 in which the conductive ink is invisible.

48. A method of processing a succession of substrates including differentially conductive patterns representing encoded information comprising the steps of:

transporting the succession of substrates including the differentially conductive patterns past a capacitance sensor;

measuring variations in capacitance associated with the differentially conductive patterns apparent as contrasts in permittivity between the patterns and the substrates;

deciphering the differentially conductive patterns into recognized units of information; and distinguishing subsequent processing among the substrates on the basis of the information obtained from their differentially conductive patterns;

wherein the differentially conductive patterns are applied using an electrically conductive ink.

49. The method of claim 48 in which the differentially conductive patterns are applied using a dielectric ink.

50. The method of claim 48 in which the differentially conductive patterns represent information in a form of bar-code.

51. A method of processing a succession of substrates including differentially conductive patterns representing encoded information comprising the steps of:

transporting the succession of substrates including the differentially conductive patterns past a capacitance sensor;

measuring variations in capacitance associated with the differentially conductive patterns apparent as contrasts in permittivity between the patterns and the substrates;

deciphering the differentially conductive patterns into recognized units of information; and distinguishing subsequent processing among the substrates on the basis of the information obtained from their differentially conductive patterns;

wherein said step of deciphering includes converting the differentially conductive patterns into equivalent alphanumeric characters.

52. The method of claim 48 in which said step of distinguishing includes sorting the substrates in accordance with the information obtained from their differentially conductive patterns.

53. A method of accessing information encoded on a substrate in a pattern using a differentially conductive medium comprising the steps of:

relatively moving a capacitance sensor into proximity with a substrate having an area to which a dielectric medium is applied in a pattern for encoding information;

measuring variations in capacitance associated with the pattern of encoded information apparent as a contrast in permittivity between the dielectric medium and the substrate; and deciphering the pattern into recognized units of information;

wherein the pattern of encoded information is a bar-code pattern and the pattern of encoded information is decipherable into alphanumeric characters.

\* \* \* \* \*